United States Patent [19]

Roy

[11] Patent Number: 5,521,255
[45] Date of Patent: May 28, 1996

[54] SYNTHESIS OF SILYL-FUNCTIONAL TELECHELIC HYDROCARBON POLYMERS

[75] Inventor: Aroop K. Roy, Midland, Mich.

[73] Assignee: Dow Corning Corporation, Midland, Mich.

[21] Appl. No.: 453,175

[22] Filed: May 30, 1995

[51] Int. Cl.$^6$ ..................................................... C08F 8/42
[52] U.S. Cl. ................. 525/342; 525/332.3; 525/332.9; 525/333.1; 525/333.2; 525/338; 525/379; 525/381; 525/385; 526/180; 526/181
[58] Field of Search .............................. 525/342, 332.3, 525/332.9, 333.1, 333.2, 379, 381, 385

[56] References Cited

U.S. PATENT DOCUMENTS

| | | | |
|---|---|---|---|
| 3,244,664 | 4/1966 | Zelinski et al. | 525/342 X |
| 3,324,089 | 6/1967 | Trepka | 526/178 X |
| 3,483,270 | 12/1969 | Bostick | 260/827 |
| 3,928,490 | 12/1975 | Hergenrother | 260/827 |
| 4,172,100 | 10/1979 | Tung | 585/25 |
| 4,196,154 | 4/1980 | Tung | 260/665 |
| 4,205,016 | 5/1980 | Tung | 260/665 |
| 4,230,815 | 10/1980 | Itoh et al. | 525/342 X |
| 4,316,973 | 2/1982 | Kennedy | 525/335 |
| 4,960,842 | 10/1990 | Lo | 526/175 |
| 5,296,574 | 3/1994 | Hoxmeier | 528/25 |
| 5,447,990 | 9/1995 | Noda et al. | 525/342 X |

FOREIGN PATENT DOCUMENTS

| | | | |
|---|---|---|---|
| 0002864 | 7/1979 | European Pat. Off. | 525/342 |
| 520279 | 12/1992 | European Pat. Off. . | |
| 1069856 | 4/1986 | Japan | 525/342 |
| 1376446 | 7/1971 | United Kingdom . | |

OTHER PUBLICATIONS

Journal of Polymer Science, No. 72, pp. 73–75 (1985); New Block Copolymers And Networks From Telechelic Prepolymers.
J. Am. Chem. Soc. 1995, 117, 3380–3388; Termination of Living Anionic Polymerizations Using Chlorosilane Derivates.
Polymer International, vol. 24, No. 4, (1991): 197–206; Dilithium Initiators Based on 1,3–bix(1–Phenylethenyl)benzene.
Polymer, 1982, vol. 23, Dec.; 1953–1959; An Efficient Bifunctional Lithium–Organic Initiator to be Used In Apolar Solvents.
Macromolecules, vol. 11, No. 3, May–Jun. 1978, 616–617; Dilithium Anionic Initiators Based on Double 1,1 Diphenylethylene Compounds.
Polymer Preprints 1989, vol. 30, No. 1, Apr. 1989; Synthesis of Poly(Butadiene)–Syndiotactic Poly(Methylmethacrylate) ABA Block Copolymers.
Macromolecules 1993, 26, 2137–2138; Acyclic Diene Metathesis (ADMET) Depolymerization.
Chinese Journal of Applied Chemistry, vol. 4, No. 5 (1987) pp. 11–14.
J. Polymer Science: Part B: Polymer Physics, vol. 30, 727–732 (1992) Relationship Between Crystallization of The PDMS Block, et al.
Macromolecules 1994, 27; 2233–2240; Studies on Dilithium Initiators.
Macromolecules 1994, 27, 5957–5963; Efficiency of the Secbutyllithium/m–Diisopropenylbenzene Diadduct, et al.
Macromolecules 1994, 27, 1680–1684; Hydrocarbon–Soluble Di— And Multifunctional Organolithium Initiators.
Macromolecules 1994, 27, 2219–2224; Studies on Dilithium Initiators. 1. Hydrocarbon Soluble Initiators.
Macromolecules 1994, 27, 2225–2232; Studies on Dilithium Initiators. 2. The Bimodal Molecular Weight Distribution In Polyisoprene.
Macromolecules 1994, 27, 2241–2248; Studies on Dilithium Initiators. 4. Effect Of Structure Variations.
Macromolecules 1994, 27, 2249–2255; Studies of Dilithium Initiators. 5. Li NMR Analysis Of Ionic Species.

*Primary Examiner*—Fred Teskin
*Attorney, Agent, or Firm*—Alexander Weitz

[57] ABSTRACT

A method for preparing a telechelic polydiene having at least 70% 1,4-microstructure and at least 70% of its end groups capped by reactive silyl functionality is disclosed, said method comprising:

(I) reacting, in a non-polar solvent solution, (A) at least one diene monomer, (B) a dianionic initiator which is soluble in said non-polar solvent and, optionally, (C) a polymerization adjuvant to form a dianionically active polydiene; and
(II) capping both ends of said dianionically active polydiene from step (I) with (D) a silane, said capping being carried out in the presence of (E) a promoter selected from the group consisting of a tertiary amine and a crown ether based on 12-crown-4.

34 Claims, No Drawings

SYNTHESIS OF SILYL-FUNCTIONAL TELECHELIC HYDROCARBON POLYMERS

FIELD OF THE INVENTION

The present invention relates to a method for preparing a silyl-functional telechelic hydrocarbon polymer or oligomer. More particularly, the invention relates to a method for synthesizing an $\alpha,\omega$-silyl-functional polymer by first polymerizing a diene monomer in a non-polar solvent using a dianionic initiator to form a living polymer dianion and then capping both ends of the living polymer with a silane in the presence of a promoter.

BACKGROUND OF THE INVENTION

Conventional hydrocarbon-based polymers generally lack mechanisms for bringing about crosslinking via low-temperature or room-temperature cure (e.g., moisture cure or addition-cure). Such cure pathways are, however, well known in the case of siloxane polymers, and the development of such facile cure mechanisms for the organic systems is highly desirable. Thus, for example, a telechelic organic polymer having suitably reactive end-groups could be reacted through chain extension and/or crosslinking schemes to produce cured compositions having precise molecular weight between crosslinks, and therefore, more predictable and controllable properties.

A small number of telechelic (i.e., having two identical reactive end-groups) hydrocarbon polymers are known and these are generally prepared by anionic or cationic polymerization of olefins. However, only a few telechelic hydrocarbon polymer systems having endgroup functionality approaching 2.0 are known and only a handful of these have reactive or potentially reactive silyl or siloxane groups at the ends (see, for example, Kennedy et al., *J. Polym. Sci. Polym. Symp.*, V. 72, 73, 1985; Marmo et al., *Macromolecules*, V. 26, 2137, 1993; U.S. Pat. No. 4,316,973 to Kennedy; and European Patent Application 0520279). However, to the best of the inventor's knowledge, the synthesis of conjugated diene-based polymers having at least 70 mol percent 1,4 microstructure and containing a reactive silyl species at each end, wherein the molecular weight can be effectively controlled during synthesis, has not been disclosed.

A viable method for synthesizing telechelic polydiene having a silyl group at each end comprises anionic polymerization of a diene monomer using a difunctional metal-based initiator (i.e, one capable of simultaneously initiating two polymer chains which grow outward from the initiator site). Two types of such initiators are available. The first (initiator A) is based on alkali metals such as Li, Na, or K in conjunction with an aromatic compound such as naphthalene; this system is generally used in a polar solvent (e.g., tetrahydrofuran). The second (initiator B) is a dimetallated, usually aromatic, hydrocarbon; this initiator can be used in polar or non-polar reaction environments. Those skilled in the art will recognize that the reaction conditions during initiation and polymerization can have profound effects on the molecular weight, molecular weight distribution and structural characteristics of the resulting polymers, particularly in the case of polydienes. Thus, in polar solvents such as tetrahydrofuran, initiator A can provide telechelic polymers having narrow polydispersity for monoolefins such as styrene and for siloxanes. In non-polar solvents, however, initiation can be heterogeneous, resulting in a broad molecular weight distribution and poor control over molecular weight. This is due to the very poor solubility of the metal/naphthalene dianionic initiator in a non-polar solvent. On the other hand, initiators of type B have slightly higher solubility in non-polar solvents and are, therefore, better suited for use therein.

From a structural perspective, anionic polymerization of dienes such as butadiene and isoprene is extremely sensitive to the polarity of the solvent used in polymerization. Polar solvents such as tetrahydrofuran (THF), even at very low proportions in an otherwise non-polar environment, lead to a high degree of 1,2 addition with butadiene and 3,4-addition with isoprene. However, it is the 1,4-addition mode which is highly desired since this structure imparts a relatively low glass temperature and can be formulated to provide good elastomeric properties. For these monomers, a non-polar solvent and, therefore, initiators of type B are required to obtain useful elastomeric polymers. Thus, when a type A initiator, such as the lithium naphthalene catalyst of the examples in European Patent Application 0520279 is used to polymerize a diene in a non-polar solvent, a small amount of a polar solvent is needed to prepare and (presumably) solubilize the catalyst. This, in turn, leads to a relatively low 1,4 addition, as shown in the examples of this European patent application, and any rubbery properties of the resulting copolymers are probably derived from the siloxane component.

In view of the above stated problems associated with type A initiators, a number of dianionic initiators of type B have been developed and used to polymerize diene monomers. For example, 1,3-bis(1-lithio-1,3-dimethylpentyl)benzene initiator, the synthesis of which from m-diisopropenylbenzene is shown in equation (1), has been used in a non-polar reaction environment by Lutz et al. in *Polymer*, V. 23, 1953, 1982 to polymerize isoprene and styrene.

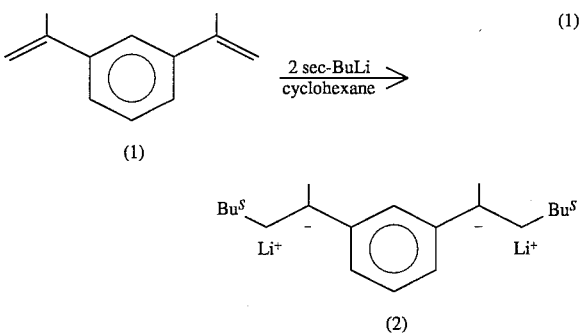

Similarly, a family of difunctional initiators based on a double 1,1-diphenylethylene structure is known to be an effective initiator for the synthesis of styrene-isoprene-styrene and styrene-butadiene-styrene triblock copolymers when used in conjunction with an amine or alkoxide polymerization adjuvant (see Tung et al., *Macromolecules*, 11, 616, 1978 as well as U.S. Pat. Nos. 4,960,842; 4,205,016; 4,196,154; and 4,182,818). For example, the preparation of this type of difunctional initiator, 1,3-phenylene-bis(3-methyl-1-phenyl-pentylidene)bis(lithium), from 1,3-bis(1-phenylethenyl)benzene is shown below in equation (2) below.

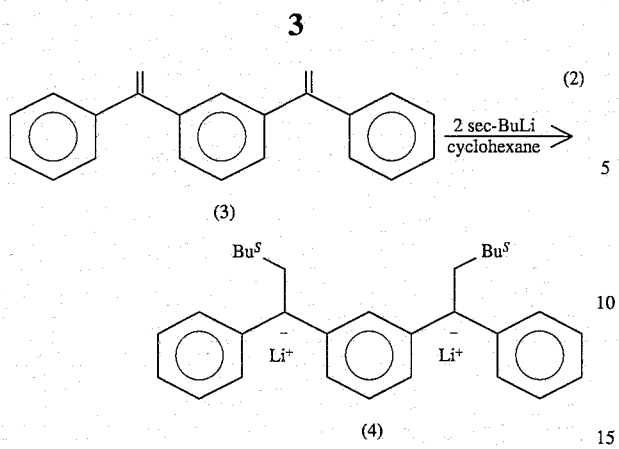

In the above equations, $Bu^s$ denotes secondary butyl radical. However, when the above mentioned 1,3-phenylene-bis(3-methyl-1-phenyl-pentylidene)bis(lithium) initiator and amine polymerization adjuvant are used to polymerize, e.g., isoprene, capping of the resulting living polymer dianion with a chlorosilane or a cyclic siloxane is inefficient. For example, the fraction of active ends capped with the chlorosilane was less than about 70%. Such a low level of endcapping is considered unacceptable, e.g., in the formulation of a curable composition, wherein the end-groups are to serve as cross-linking sites. It is also known in the art that dianionically active initiators and polymers exhibit strong and complex association phenomena, particularly in non-polar media. For dianionically active polydienes, such as dianionically active isoprene, it is believed that the above mentioned association is responsible for the inefficient end capping.

SUMMARY OF THE INVENTION

It has now been discovered that special conditions are necessary to overcome the limitations of the above described methods wherein particular dienes are polymerized in a non-polar solvent and the resulting living polymer or oligomer is subsequently endcapped to produce a silyl-functional telechelic polymer or oligomer. The method disclosed herein allows the preparation of a silyl-functional telechelic polydiene which has a high proportion of 1,4-addition (at least about 70% mol 1,4-microstructure), and a high degree of endcapping (at least about 70% mol of the end groups). In preferred embodiments of the invention, the polydiene also has a narrow molecular weight distribution, typically $\leq 1.2$ (i.e., weigh average molecular weight divided by number average molecular weight). These highly desirable results may be attained by restricting the amount of adjuvant present during the polymerization step while employing particular promoters, and levels thereof, during the capping reaction.

The present invention therefore relates to a method for preparing a silyl-functional telechelic polydiene comprising:
(I) reacting, in a non-polar solvent solution,
  (A) at least one monomer having the general formula $CH_2=C(Q)CH=CH_2$ wherein Q is selected from the group consisting of hydrogen, a methyl radical, fluorine and chlorine,
(B) a dianionic initiator which is soluble in said non-polar solvent and, optionally,
(C) a polymerization adjuvant selected from the group consisting of an organic tertiary amine, an organic alkoxide and an ether,
to form a dianionically active polydiene; and
(II) capping both ends of said dianionically active polydiene from step (I) with
(D) a silane having the formula $R_nSiX_{(4-n)}$ wherein R is independently selected from the group consisting of hydrogen, an alkyl radical having 1 to 20 carbon atoms and an aryl radical having 6 to 14 carbon atoms, X is independently selected from the group consisting of halogen, acyloxy having 2 to 6 carbon atoms, dialkylaminoxy having 2 to 12 carbon atoms and alkoxy having 1 to 6 carbon atoms and n is an integer having a value of 0 to 3, with the proviso that when R is hydrogen the value of n is 1 or 2 and when n=3 at least one R is an aryl radical,
said capping being carried out in the presence of
(E) a promoter selected from the group consisting of a tertiary amine and a crown ether based on 12-crown-4,
wherein said silyl-functional telechelic polydiene has at least 70% 1,4-microstructure and at least 70% of its end groups are capped by said silane.

The invention further relates to the above method wherein the silyl-functional telechelic polymer or oligomer is hydrogenated to prepare a partially saturated, or essentially fully saturated, polymer or oligomer.

The invention also relates to silyl-functional telechelic polydienes, as well as hydrogenated versions thereof.

DETAILED DESCRIPTION OF THE INVENTION

The method according to the present invention comprises two separate steps: (I) polymerizing the diene monomer in a non-polar solvent to form a living polymer dianion, and (II) capping the living polymer dianion with a silane to form the silyl-functional telechelic polymer or oligomer.

In step (I), at least one diene monomer (A) having the general formula $CH_2=C(Q)CH=CH_2$, wherein Q is selected from the 15 group consisting of hydrogen, a methyl radical, fluorine and chlorine, is reacted in a non-polar solvent solution with (B) a dianionic initiator, optionally in the presence of (C) a polymerization adjuvant, to form a solution of a polydiene which is anionically active at both ends. It is contemplated herein that a single monomer or a mixture of diene monomers may be used as component (A), but preferred systems are based on homopolymers or copolymers of isoprene (i.e., $Q=CH_3$ in the above formula) and 1,3-butadiene (i.e., Q=H in the above formula). It is also contemplated that up to about 10 mole percent of at least one other non-diene, olefinic, anionically polymerizable monomer (A'), described infra, may be used together with the diene (A) provided chain propagation is not hindered during the polymerization step, described infra, and at least 70 mole percent of the repeat units based on the diene monomer (A) have a 1,4 microstructure (i.e., the repeat units are represented by the formula $-CH_2-C(Q)=CH-CH_2-$ wherein Q has its previous definition).

As used herein, a non-polar solvent is defined as a hydrocarbon which is fluid at the given reaction conditions and is inert with respect to all components used in the instant method. Specific examples of suitable non-polar solvents include aromatic solvents such as benzene, toluene and xylene; alkanes having 4 to 20 carbon atoms such as butane, pentane, hexane, heptane and octane; and cycloaliphatics having 5 to 20 carbon atoms such as cyclohexane, cyclooctane and cyclododecane, inter alia, cyclohexane and toluene being preferred.

For the purposes of the present invention, component (B), or a combination of (B) and (C), must be soluble in the above mentioned non-polar solvent and, as a soluble species, be capable of initiating polymerization of monomer (A) to produce a living polymer dianion having at least 70 mole percent 1,4 microstructure. Such initiators are exemplified by lithium compounds based on double 1,1-diphenylethylene. These initiators are well known in the art and are described, e.g., in U.S. Pat. Nos. 4,960,842; 4,205,016; 4,196,154; and 4,172,100, the specifications of said patents being hereby incorporated by reference. Preferably, they have the general structure described in U.S. Pat. No. 4,205, 016. Most preferably, they have the general structure disclosed in U.S. Pat. No. 4,960,842, cited supra:

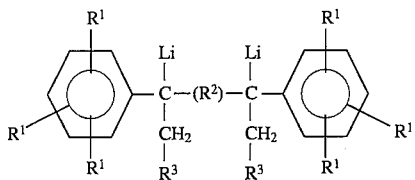

wherein $R^1$ is independently selected from the group consisting of hydrogen and an inert radical having up to 16 carbon atoms; $R^2$ is a divalent organic radical having at least 6 carbon atoms and having at least one aromatic ring which is directly attached to a carbon which is attached to an aromatic ring of the above formula; and $R^3$ is a monovalent radical having 1 to 20 carbon atoms which is independently selected from the group consisting of alkyl, cycloalkyl, aromatic, mixed alkyl/aromatic and mixed cycloalkyl/aromatic. In this context, the term "inert" indicates that the substituent $R^1$ does not interfere in any way with the polymerization and subsequent endcapping, as described infra. Examples of inert substituents in this regard include such radicals as fluorine, chlorine and alkoxy, inter alia. Most preferably, this type of initiator is the 1,3-phenylene-bis(3-methyl-1-phenyl-pentylidene)bis(lithium) (4) described supra.

Component (B) is also exemplified by lithium compounds based on 1,3-dialkenylbenzene. These initiators are well known in the art (e.g., Lutz et al., cited supra) and have the general formula

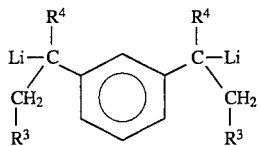

wherein $R^4$ is independently selected from the group consisting of hydrogen and an alkyl radical having 1 to 6 carbon atoms; and $R^3$ is as defined above. Preferably, this type of initiator is the above mentioned 1,3-bis(1-lithio-1,3-dimethylpentyl)benzene (2).

The initiator (B) is typically used at an initial concentration of up to about $10^{-1}$ molar in the polymerization solution, the amount employed being inversely related to the desired polymer molecular weight.

When the initiator is of the type based on double 1,1-diphenylethylene, a polymerization adjuvant (C) is used in the above first step. This adjuvant may be an organic tertiary amine, such as N,N,N',N'-tetramethylethylenediamine; an organic alkoxide, such as isopropoxide and sec-butoxide; or an ether, such as anisole. Preferably component (C) is N,N,N',N'',N''-pentamethyldiethylenetriamine (PMDETA) which has the structure $(Me)_2$—N—$CH_2CH_2$—N(Me)—$CH_2CH_2$—$N(Me)_2$, wherein Me hereinafter denotes a methyl radical. For example, when component (A) is isoprene or butadiene, the ratio of moles of amine to the moles of active ends of the anionically active polydiene (i.e., the moles of lithium) is preferably in the range of about 1:20 to about 1:4, more preferably 1:8 to 1:6. In the case of isoprene polymerization, this ratio is preferably about 1:6. When this molar ratio is less than about 1:20, the polymer obtained generally has an unacceptably broad molecular weight distribution and/or has a bimodal distribution. On the other hand, when this ratio is greater than about 1:6, the polymerization results in less than about 70 mol % of the desirable 1,4 addition.

The above described polymerization reaction may be illustrated for the case of initiators based on double 1,1-diphenylethylene by the following generalized equation, wherein (DFI) represents the difunctional initiator, (j+k) is the degree of polymerization and Q has its previously defined meaning.

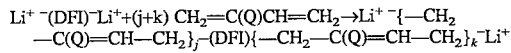

In a similar fashion, the initiator based on 1,3-dialkenylbenzene may be used to prepare a living polymer dianion. However, in this case, an adjuvant is not required and is preferably not used.

As mentioned above, the living polymer dianion, as well as the capped polymer or oligomer derived therefrom and described infra, consists essentially of units having the formula —$CH_2$—C(Q)=CH—$CH_2$— (i.e., the 1,4-microstructure). The living polymer dianion may also be optionally further reacted with another anionically polymerizable monomer (A') before being capped, as described infra. For example, when the initiator based on double 1,1-diphenylethylene is employed, this additional monomer (A') polymerizes at both ends to form a new living polymer dianion of the type

in which G represent a polymer or oligomer segment based on (i.e., formed from) the above described diene monomer and, optionally, up to 10 mole percent of monomer (A'), the polydiene repeat units of G having at least 70% 1,4-microstructure. In formula (I), Z represents a polymer or oligomer segment based on (i.e., formed from) the optional monomer (A'). Likewise, when the initiator is of the type based on 1,3-dialkenylbenzene, this additional monomer (A') polymerizes at one end to form a new living polymer dianion of the type

in which G and Z are as defined above. The additional monomer (A') may be illustrated by such compounds as styrene, methylmethacrylate, methylacrylate, acrylonitrile and vinyl chloride, inter alia. Preferably, (A') is styrene.

The above described polymerization reactions are carried out under dry, inert (e.g., nitrogen purge) conditions, typically at a temperature of 0° C. to 80° C. However, it is preferred that the polymerization time is kept short (e.g., below about 2 hours at >40° C.) in order to obtain a narrow molecular weight distribution (i.e., ≦1.2). At longer polymerization times, the polydispersity has been observed to increase and a bimodal molecular weight distribution often results. Although there is no intent to limit the invention based on any mechanism or theory, it is believed that this broadening of molecular weight distribution is due to complex chain transfer reactions which adversely affect the telechelic character of the resulting polymer and limit the utility thereof in crosslinking and/or chain extension applications.

In the second step according to the instant invention, the living polymer dianion prepared in step (I) is capped, in the non-polar solvent solution and in the presence of a promoter (E), with a silane (D) having the formula $R_nSiX_{(4-n)}$ according to the following generalized equation for the case of the initiator based on double 1,1-diphenylethylene, wherein (DFI), j and k have their previously defined meanings:

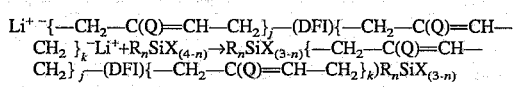

Li⁺⁻{—CH₂—C(Q)=CH—CH₂}ⱼ—(DFI){—CH₂—C(Q)=CH—CH₂}ₖ⁻Li⁺+R$_n$SiX$_{(4-n)}$→R$_n$SiX$_{(3-n)}${—CH₂—C(Q)=CH—CH₂}ⱼ—(DFI){—CH₂—C(Q)=CH—CH₂}ₖR$_n$SiX$_{(3-n)}$

In these formulae, R is independently selected from the group consisting of hydrogen, an alkyl radical having 1 to 20 carbon atoms and an aryl radical having 6 to 14 carbon atoms, X independently selected from the group consisting of halogen, acyloxy having 2 to 6 carbon atoms, dialkylaminoxy having 2 to 12 carbon atoms and alkoxy groups having 1 to 6 carbon atoms. Specific examples of R groups include ethyl, propyl, butyl, hexyl, octyl, isopropyl, 2-ethylhexyl, phenyl, tolyl, xylyl and naphthyl. Specific examples of X groups include chlorine, bromine, acetoxy, propionyloxy, dimethylaminoxy, diethylaminoxy, ethylmethylaminoxy, methoxy, ethoxy, isopropoxy, n-butoxy and hexoxy. Further, in the above formulas, n is an integer having a value of 0 to 3, with the proviso that when R is hydrogen the value of n is 1 or 2. Also, in order to assure at least one reactive group at each end of the polymer or oligomer, at least one R group of silane (D) must be an aryl group when n=3, as discussed infra. In preferred systems, R is selected from the group consisting of hydrogen, methyl and phenyl and X is selected from the group consisting of chlorine, acetoxy, methoxy and ethoxy. Particularly preferred silanes of the present invention are represented by the following formulae, wherein Me, Et, Ph and Ac hereinafter denote methyl, ethyl, phenyl and acetyl groups, respectively:

Si(OMe)₄,

Si(OEt)₄,

Si(OAc)₄,

MeSi(OMe)₃,

Me₂Si(Cl)₂,

PhMe₂SiCl,

Ph₂MeSiCl and

Me₂Si(H)Cl.

When these preferred silanes are used to cap the above described living polymer dianion, the following reactive silyl end groups are obtained:

Si(OMe)₃—,

Si(OEt)₃—,

Si(OAc)₃—,

MeSi(OMe)₂—,

Me₂Si(Cl)—,

PhMe₂Si—,

Ph₂MeSi— and

Me₂Si(H)—, respectively.

The skilled artisan will recognized that, when the above mentioned optional anionically polymerizable monomer (A') is used to form the living polymer dianions shown in formulas (I) or (II), the final telechelic copolymer will have a main chain of the formula (III) or formula (IV), respectively:

—ZGZ—             (III)

—GZ—             (IV)

wherein G is and Z are as defined above and at least 70% of the end groups of the copolymer are of the formula $R_nSiX_{(3-n)}$—, in which R, X and n have their previously defined meanings.

The promoter (E) used in the silane capping reaction is selected from the group consisting of a tertiary amine and a crown ether based on 12-crown-4. Specific examples of suitable tertiary amines include N,N,N',N'-tetramethylethylenediamine, N,N,N',N",N"-pentamethyldiethylenetriamine (PMDETA), N,N,N',N",N"-pentamethyldi-1,3-propylenetriamine, 4-ethyl-1,1,7,7-tetramethyldiethylenetriamine, a particularly preferred amine being the above mentioned PMDETA. Specific examples of suitable crown ethers include 12-crown-4 and substituted 12-crown-4, such as benzo-12-crown-4, the latter being preferred.

The promoter (E) is preferably added to the polymer dianion solution before introduction of the silane (D) and it is preferably an amine of the type discussed above in connection with the polymerization step, as well as preferred embodiments thereof. As in step (I), the capping reaction is also carried out under dry, inert conditions, typically at a temperature of 0° to 60° C.

To obtain a high degree of capping when the initiator is based on double 1,1-diphenylethylene and a tertiary amine promoter is used, the molar ratio of promoter to the active ends of the anionic polydiene (i.e., moles of lithium) should be in the range of about 1:2 to 1:4, preferably 1:3. When this ratio is less than about 1:4, the percentage of end groups which are capped in this step generally falls below the desired level of at least about 70%. When this ratio is greater than about 1:2, the removal of the amine becomes difficult and this removal is necessary if the capped polymer is to be hydrogenated, as described infra. When the polymerization adjuvant used in step (I) is an amine and the promoter is also an amine, the above ratio is based upon the total moles of amine present.

When the initiator is of the type based on 1,3-dialkenylbenzene, and the promoter is a tertiary amine, the ratio of promoter to the active ends of the anionic polydiene should be in the range of about 1:2 to 1:10, preferably 1:6.

Based on the above description, the skilled artisan will, through routine experimentation, readily find the proper ratio for a given combination of initiator and promoter to obtain a polymer or oligomer having at least 70% mol 1,4-addition wherein at least 70% mole of the ends are capped with silyl group of the invention.

It is also preferred that an ether solvent, such as tetrahydrofuran (THF), is added to the reaction medium in the instant process. This addition preferably takes place after step (I) and may be done before, or concurrent with, the addition of the promoter. The main advantage of this added solvent is reduction of reaction medium viscosity, an important consideration in commercial applications. Also, since the ether is added after diene polymerization, the degree of 1,4-microstructure in the polydiene is not altered.

After the above described synthesis, the telechelic polymer or oligomer of the present invention may be isolated from the non-polar solvent solution by any conventional means. For example, the solvent may be stripped out at elevated temperature and/or reduced pressure or the polymer precipitated from solution by adding a polar solvent such as methanol. Preferably, the polymer is stripped of solvent and then purified by repeated dissolution/precipitation, as illustrated in the examples, infra.

A silyl-functional telechelic diene polymer prepared according to above methods can be hydrogenated to produce the corresponding partially saturated or essentially fully saturated telechelic polymer. These saturated polymers would be expected to have improved stability (e.g., thermal, oxidative, u.v. radiation) and have superior mechanical properties relative to the unsaturated parent materials.

The hydrogenation can be carried out in a solvent at either low pressure (e.g., atmospheric) or at high pressures by techniques known in the art using homogeneous or heterogeneous catalysis. Suitable catalysts for this purpose include such systems as Pt/carbon, Pd/carbon and Co/Ni carboxylates (for homogeneous reaction), a preferred catalyst system being palladium-on-carbon. However, when an amine is used in the above described preparative method, either as the polymerization adjuvant or as the promoter, essentially all of the amine may have to be removed prior to hydrogenation since it can "poison" the catalyst, particularly in the preferred embodiments of initiator/amine/hydrogenation catalyst taught herein. Removal of residual amine may be accomplished by, e.g., passing the polymer through acid alumina or, preferably, stirring the unsaturated polymer solution over 10% Pd/C for 12–18 hours, followed by filtration. Near-complete (>98%) hydrogenation of the telechelic polydienes can best be achieved by hydrogenating at higher hydrogen pressure (e.g., 5 to 100 atmospheres).

The unsaturated, but preferably the saturated, silyl-functional telechelic polymers produced according to the methods disclosed herein find utility in the formulation of compositions for adhesives, sealants, elastomers, rubbers and coatings.

Curable compositions can be prepared by methods conventionally used in the silicone arts for the above described telechelic polymer having reactive silyl ends. Thus, for example, when the silyl end groups are of the type $\equiv$SiH, the telechelic polymer can be chain extended and/or cured with a compound containing vinylic unsaturation (i.e., —CH=CH$_2$ groups) using a hydrosilation catalyst such as platinum. Likewise, when the ends are of type $\equiv$SiOR", in which R" is a lower alkyl group such as methyl or ethyl, the polymer can be cured by exposure to moisture using a organic titanium catalyst.

Also, although not generally considered reactive, a group of the type $\equiv$SiAr, in which Ar denotes an aryl group such as phenyl radical, is a defined reactive group for the purposes of the present invention. The aryl radical in such a group may be cleaved with a strong acid after the diene polymer is hydrogenated. Suitable strong acids, such as hydrochloric, toluene sulfonic acid, benzene sulfonic acid or triflic acid, react with the aryl-containing group to generate the reactive $\equiv$Si—Y group, wherein Y is the anionic residue from the strong acid (e.g., Y=Cl for hydrochloric acid; Y=OSO$_2$CF$_3$ for triflic acid). The resulting Si—Y-terminated polymers can then participate in chain extension or crosslinking reaction.

EXAMPLES

The following examples are presented to further illustrate the method of this invention, but are not to be construed as limiting the invention, which is delineated in the appended claims. All parts and percentages in the examples are on a weight basis and all measurements were obtained at 25° C., unless indicated to the contrary. In the examples, Me, Et, Bu and Ph denote methyl, ethyl, butyl and phenyl radicals, respectively.

Materials

Isoprene, sec-BuLi solution (1.3 M in cyclohexane), anhydrous tetrahydrofuran (THF), pentamethyldiethylenetriamine (PMDETA), tetraethoxysilane, and 1,3-diisopropenylbenzene (1) were obtained from Aldrich Chemical Company, Milwaukee, Wis.. 1,3-bis(1-phenylethenyl)benzene (3) was obtained from the Dow Chemical Company, Midland, Mich.

General Procedures

Isoprene was distilled in small batches from CaH$_2$ after stirring over the hydride for 18 hours, and stored at −25° C.

PMDETA, chlorosilanes, tetraethoxysilane and 1,3-diisopropenylbenzene (1) were stirred/distilled from CaH$_2$. The distilled reagents were transferred inside a glove bag, under nitrogen, to dry glass bottles equipped with rubber septa for storage.

The sec-BuLi solution was titrated with 1.0 M sec-butanol in xylene using 1,10-phenanthroline as indicator to obtain its exact molarity according to the method of Watson and Eastham (*J. Organomet. Chem.*, V. 9, 165, 1969).

Eighty grams of 1,3-bis(1-phenylethenyl)benzene (3) was dissolved in 400 mL of Optima™ grade 2-propanol (Fisher Scientific Co., Pittsburgh, Pa.) by stirring and heating to 40°–50° C. in a round-bottomed flask. A further 200 mL of this solvent was added and the solution was cooled overnight at about −15° C. The crystals that formed were filtered cold under vacuum and washed once with cold (−15° C.) 2-propanol. The last traces of solvent were removed under vacuum (0.1 mm, 4 h) at room temperature. Recovery of recrystallized (3) was about 60 g.

Anhydrous THF from Aldrich, and HPLC-grade cyclohexane from Fisher were distilled from sodium/benzophenone ketyl and stored in oven-dried amber bottles which had been allowed to cool under a stream of dry nitrogen. The bottles were stoppered with doubled rubber septa.

Polymer characterization was performed using $^1$H NMR (200 MHz/400 MHz) spectroscopy and gel permeation chromatography (GPC) with polyisoprene standards from Scientific Polymer Products (Ontario, N.Y.). Number ($M_n$) and weight ($M_w$) average molecular weights were reported. The degree of endcapping was determined by integration of appropriate signals in the proton NMR spectra.

All initiator preparation, polymerization and endcapping reactions were performed under an atmosphere of dry, oxygen-free nitrogen.

COMPARATIVE EXAMPLE 1

An oven-dried (125° C.), 3-neck, 1 L flask containing a magnetic stirring bar was equipped with a rubber septum, gas inlet and stopper. All glass-to-glass connections were made using clean, dry teflon sleeves at the flask necks. The flask was evacuated hot, allowed to cool under vacuum, then back filled with nitrogen. A positive nitrogen pressure was maintained at a mineral oil "bubbler" (attached to the gas inlet of the flask by a "Y" connector) throughout the course of reaction. Dry cyclohexane (600 mL) was transferred by cannula into the flask. 1,3-diisopropenylbenzene (1) (1.0 mL, 0.006 mol) was added to the flask via a microliter syringe. The solution was heated to 55°–57° C. using a water bath. Sec-BuLi was withdrawn into a dry syringe then slowly added to the flask through the rubber septum until the first permanent appearance of a yellow-orange color. A stoichiometric amount of the sec-BuLi required for complete dianion (2) formation (0.012 mol) was then added.

The solution was stirred for 2 h at 56°–58° C., with careful control of bath temperature (the dianion partially precipitates if heated for too long above about 60° C.). The resulting deep red solution was then cooled to 20°–25° C. using an ice bath. Isoprene (30.0 mL, 0.300 mol) was added via syringe, the solution was stirred at 20°–25° C. for 10 min, and then heated at 55°–57° C. for 2 h. This resulted in a solution containing living polymer dianion. Dry THF (60 mL) was then added and the color of the solution, which had lightened to an orange during polymerization, deepened again. To a second flask, equipped and prepared as described above, there was charged 8.5 mL of tetraethoxysilane (0.038 mol; about 200% stoichiometric excess) via syringe. The flask was heated to 55°–60° C. using a water bath. The living polymer dianion prepared above was transferred by cannula into the excess tetraethoxysilane over an interval of 10–15 minutes. This final mixture was stirred at 55°–60° C. for 4.5 h, then stirred at room temperature for another 14–16 h. Following this, solvents were removed at 50°–55° C. under reduced pressure and the crude polymer that formed was purified by two precipitations from THF into methanol, followed by two washings with methanol. The purified polymer was dried in a vacuum oven for 20 h at 50° C.

Characterization of the polymer gave the following results: Microstructure—92% 1,4-addition; molecular weight—$M_n$=4100, $M_w/M_n$=1.06 (about 10–15% of the polymer had $M_n$=11000; endcapping with —Si(OEt)$_3$ group=55–60%. This relatively low level of endcapping is consistent with the observations of Yu et al. (*Macromolecules* 1994, 27, 5957). These workers reported that the dianion prepared in (Comparative) Example 1 initiates polymerization at only one end; the other anionic end remains inactive with respect to chain propagation due to association effects. However, this other end is active with respect to endcapping in the presence of promoter, as shown in Example 10, infra.

EXAMPLE 2

With essentially the same equipment set up and initial flask preparation as in Example 1, a flask was charged with the initiator precursor 1,3-bis(1-phenylethenyl)benzene (3) (0.564 g, 0.002 mol) under a nitrogen purge. The flask was then reevacuated for 30 minutes at room temperature and backfilled with nitrogen. Dry cyclohexane (400 mL) was transferred to the flask by cannula and the solution heated to 40°–45° C. Sec-BuLi (0.004 mol) was added in the same fashion as in Example 1. The solution was then heated at 58°–61° C. for 3 h to ensure complete formation of the dianion 1,3-phenylene-bis(3-methyl-1-phenyl-pentylidene)bis(lithium) (4). After cooling the solution to about 25° C., PMDETA (0.15 mL, 0.0007 mol) was added using a microliter syringe. Upon stirring this mixture for 10 min, isoprene (20.0 mL, 0.200 mol) was added, the mixture was stirred for 10 minutes at room temperature, then for 1.75 h at 52°–54° C. to prepare a living polyisoprene dianion. At this point, an additional 0.0007 mol of PMDETA was added and about three-fourths to four-fifths of the resulting solution was transferred by cannula to a second flask containing 200% excess Si(OEt)$_4$, as in Example 1. In this example the total amine:living end ratio was therefore about 1:3 (i.e., 0.004/0.0014=2.9 or 1:2.9). No lightening of the living polymer dianion color was observed in 15 min. An additional 200% excess of Si(OEt)$_4$ was introduced. Immediate disappearance of the dianion color occurred (this phenomenon was observed in several experiments with Si(OEt)$_4$ as the endcapping agent). The solution was heated for another 1.5 h at 58°–60° C., then stirred for 14–16 h at room temperature. Solvent and volatiles were removed as in Example 1, and the polymer was purified by precipitation from dry THF into absolute ethanol, followed by vacuum drying at 55°–60° C.

To the remainder of the living polymer dianion solution in the first flask, 1 mL of 2-propanol was added to quench the dianion. The polymer was worked up as above and purified by precipitation from THF into methanol followed by vacuum drying at 55°–60° C.

Characterization (quenched polymer): Microstructure—71% 1,4-addition; molecular weight—$M_n$=8000, $M_w/M_n$=1.19.

Characterization (capped polymer): Microstructure—71% 1,4-addition; molecular weight (main GPC peak)—$M_n$=8600, $M_w/M_n$=1.19. For about 30% of the polymer, displacement of more than one OEt group with Si(OEt)$_4$ occurred and, taking into account the formation of about 30% Si(OEt)$_2$ ends, the endcapping was 91% from $^1$H NMR analysis (i.e., either Si(OEt)$_2$ ends or Si(OEt)$_3$ ends).

COMPARATIVE EXAMPLE 3

The procedure of Example 2 for the preparation of the living polyisoprene dianion was essentially repeated. After the addition of dry THF (8 mL, 2% v/v), about half of the polymer dianion solution was transferred by cannula to a second flask as described in Example 2. To the first flask, PhMe$_2$SiCl was added, and to the second flask Ph$_2$MeSiCl was added. Since reaction appeared to be slow, even at 60° C., a further 4 mL of THF was added to each flask. Each flask was maintained at 60° C. for 2.5 h. The solutions were then stirred overnight at room temperature. Following solvent removal, each resulting polymer was purified by precipitation from THF into methanol (two precipitations for the Ph$_2$MeSi-ended polymer) and vacuum dried at 60° C.

A summary of the amounts of the ingredients used in this example appears below:

Cyclohexane—400 mL. Difunctional initiator precursor (3)—0.564 g, 0.002 mol (i.e., 0.004 mol total anion). PMDETA—0.144 mL, 0.0007 mol. Amine:living end ratio—1:6. Isoprene—30.0 mL, 0.300 mol. PhMe2SiCl (first flask)—0.4 mL, 0.0024 mol (20% molar excess). Ph$_2$MeSiCl (second flask)—0.5 mL, 0.0024 mol (20% molar excess).

Characterization of PhMe$_2$Si-ended polymer: Microstructure—76% 1,4-addition; molecular weight—$M_n$=13000, $M_w/M_n$=1.12; percent endcapping with —SiMe$_2$Ph groups=69%.

Characterization of Ph2MeSi-ended polymer: Microstructure—76% 1,4-addition; molecular weight—$M_n$=13000, $M_w/M_n$=1.16; percent endcapping with —SiMePh$_2$ groups=67%.

This example demonstrates that an amine to living end ratio of about 1:6 is not sufficient for high degree of endcapping, even in the presence of 4% v/v THF. The addition of THF did, however, lower the viscosity of the solution and improved stirring efficiency.

EXAMPLE 4

The procedure of (Comparative) Example 3 was essentially repeated for the preparation of living polyisoprene dianion except that the polymerization was carried out for 2.5 h using an amine:living end ratio of 1:6 for initiation. After the addition of a second charge of PMDETA to bring the amine to living end ratio to 1:3 for endcapping, the solution was again divided into two roughly equal parts. To the first flask, 8 mL (4% v/v) of THF was added. PhMe$_2$SiCl was then added to both flasks at 60° C. The two flasks were heated at 55°–60° C. for 2.5 h, then stirred for 14–16 h at room temperature. Following solvent and volatiles removal, the polymers were purified by precipitation from THF into methanol, then vacuum dried at 62° C. for 20 h.

A summary of the amounts of the ingredients used in this example appears below:

Cyclohexane—400 mL. Difunctional initiator precursor (3)—1.13 g, 0,004 mol (i.e., 0.008 mol total anion). PMDETA—0.29 mL, 0.0014 mol, initially, followed by another 0.29 mL before endcapping. Isoprene—20.0 mL, 0.200 mol. PhMe$_2$SiCl—0.8 mL, 0.005 mol (20% molar excess) for each flask.

Characterization (without THF addition): Microstructure—77% 1,4-addition; molecular weight (bimodal due to long polymerization time used)—M$_n$=3400, M$_w$/M$_n$=1.36; Percent endcapping with —SiMe$_2$Ph groups=100%.

Characterization (with THF addition): Microstructure—77% 1,4-addition; molecular weight—M$_n$=3400, M$_w$/M$_n$=1.37. Percent endcapping with —SiMe$_2$Ph groups=100%.

This example demonstrates that a total amine to living end ratio of at least about 1:3 is required for a high degree of endcapping when the 1,3-phenylene-bis(3-methyl-1-phenylpentylidene)bis(lithium) initiator is used. With this ratio, the presence of THF is not essential, though the stirring is facilitated. Example 4 also demonstrates that long polymerization times (e.g., greater than about 2 hours) may lead to a bimodal molecular weight distribution.

When the above experiment was repeated using a polymerization time of about 1.75 hours, the microstructure and percent capping were essentially the same, but the polydispersity was <1.2 (see Example 6).

COMPARATIVE EXAMPLE 5

The procedure of (Comparative) Example 3 was essentially repeated for the preparation of the living polyisoprene dianion, except that an amine to living end ratio of 1:3 was used during the polymerization stage. The living polymer dianion was again divided into two roughly equal parts (after addition of 4% v/v THF). To the first part there was added PhMe$_2$SiCl (20% excess). The second part was added to Si(OEt)$_4$ (400% excess, added in two portions as in Example 2). Both mixtures were heated for 2 h at 55°–60° C., then stirred for 14–16 h at room temperature. Following solvent and volatiles removal, the polymers were purified by precipitation from THF into methanol for the —SiMe$_2$Ph ended polymer and into absolute ethanol for the —Si(OEt)$_3$ ended polymer. The polymers were then vacuum dried at 60° C. for 20 h.

A summary of the amounts of the ingredients used in this example appears below:

Cyclohexane—200 mL. Difunctional initiator precursor (3)—1.13 g, 0.004 mol (i.e., 0.008 mol total anion). PMDETA—0.59 mL, 0.0028 mol. Amine:living end ratio—1:3 for initiation, and 1:3 for endcapping. Isoprene—20.0 mL, 0.200 mol. PhMe$_2$SiCl (first flask)—0.8 mL, 0.005 mol (20% molar excess). Si(OEt)$_4$ (second flask)—4.5 mL, 0.04 mol (400% excess).

Characterization (PhMe$_2$Si-ended polymer): Microstructure—50% 1,4-addition, almost 50% 3,4-addition, and even a few percent 1,2-addition; molecular weight—M$_n$=3500, M$_w$/M$_n$=1.13; percent endcapping with —SiMe$_2$Ph groups=100%.

Characterization [(EtO)$_3$Si-ended polymer]: Microstructure—50% 1,4-addition, almost 50% 3,4-addition, and even a few percent 1,2-addition; molecular weight (main GPC peak)—M$_n$=3600, M$_w$/M$_n$=1.13. For about 30% of the polymer, displacement of more than one OEt group with Si(OEt)$_4$ occurred and the percent endcapping taking this into account was 100%.

From this example, it was established that an amine to living end ratio of 1:3 (or higher) can not be used for initiation, since this leads to an unacceptably low 1,4-addition microstructure. However, an amine to living end ratio of at least 1:3 is required to achieve a high degree of end capping. Therefore, the amine must be added in two parts so as to ensure both high 1,4-addition and high endcapping for an initiator based on double 1,1-diphenylethylene.

EXAMPLE 6

The procedure of (Comparative) Example 3 was essentially repeated for the preparation of the living polyisoprene dianion as well as for endcapping with PhMe$_2$Si groups and with Ph$_2$MeSi groups. The only difference was that the PMDETA was added in two parts such that there was a 1:6 amine to living end ratio during initiation but a 1:3 ratio during endcapping.

A summary of the amounts of the ingredients used in this example appears below:

Cyclohexane—400 mL. Difunctional initiator precursor (3)—1.41 g, 0.005 mol (i.e., 0.010 mol total anion). PMDETA—0.36 mL, 0.0017 mol for initiation, followed by another 0.36 mL for endcapping. Isoprene—50.0 mL, 0.500 mol. THF—8 mL, 2% v/v added before dividing solution for endcapping (a further 4 mL added to flask containing Ph$_2$MeSiCl, after addition of the chlorosilane). PhMe$_2$SiCl (first flask)—1.1 mL, 0.0068 mol (30% molar excess). Ph$_2$MeSiCl (second flask)—1.4 mL, 0.0068 mol (30% molar excess).

Characterization (PhMe$_2$Si-ended polymer): Microstructure—81% 1,4-addition; molecular weight—M$_n$=7500, M$_w$/M$_n$=1.14; percent endcapping with —SiMe$_2$Ph groups=100%.

Characterization (Ph$_2$MeSi-ended polymer): Microstructure—81% 1,4-addition; molecular weight—M$_n$=7600, M$_w$/M$_n$=1.17; percent endcapping with —SiMePh$_2$ groups=100%.

COMPARATIVE EXAMPLE 7

Hydrogenation catalyst consisting essentially of 10% palladium-on-carbon (1.1 g, equivalent to Pd:C=C ratio 1:200) was weighed into a dry, nitrogen-purged, 500 mL glass Parr hydrogenation bottle. The purified polymer from (Comparative) Example 1 (15 g, 0.22 mol isoprene units) was dissolved in dry cyclohexane (100 mL) in this bottle. The bottle was set up in a Parr Low Pressure Hydrogenator and purged thrice with hydrogen at 56 psig. Hydrogenation was then carried out for 30 h at 60° C. and 56 psig hydrogen pressure. The solution was centrifuged to remove most of the carbon, then pressure-filtered through a 0.8 μm nylon membrane filter under 80 psig argon pressure. The filtrate was stripped at 60° C. under vacuum to remove the solvent, and the polymer was vacuum dried for 24 h at 65° C.

Characterization: No loss of $Si(OEt)_3$ groups was observed by proton NMR after hydrogenation. Percent hydrogenation=93-94%.

EXAMPLE 8

$PhMe_2Si$-ended polymer (2.0 g) from Example 6 (in cyclohexane solution) was filtered through acid alumina (Fisher Scientific) and hydrogenated in the same fashion as in (Comparative) Example 7 for 46 h at 60 psig $H_2$ and 60° C. After purification, the percent hydrogenation was determined to be 48.

EXAMPLE 9

Another 3.0 g batch of $PhMe_2Si$-ended polymer from Example 6 (filtered through acid alumina) was hydrogenated according to the procedure of Example 8, for 72 h. After purification, the percent hydrogenation was determined to be 78%.

Examples 8 and 9 indicated incomplete removal of residual amine (PMDETA) from the polymers by the acid alumina column. When the polymer is stirred over palladium-on-carbon and then filtered through a 0.5 micrometer nylon membrane to remove the PMDETA catalyst poison, the percent hydrogenation is increased to over 90%. Furthermore, when this procedure is repeated at 150° C./400 psi for approximately 20 hours, the degree of saturation of the polymer is about 98%.

EXAMPLE 10

The procedure of (Comparative) Example 1 was followed to prepare a polyisoprene living polymer dianion, except that a charge of PMDETA (amine to living end ratio=1:6) was added prior to the introduction of the sec-BuLi. About midway into the polymerization stage (total polymerization time=100 min. at 40° to 45° C.), a small amount of brown solid was observed. After polymerization, dry THF (8 mL, 2%v/v) was added, followed by 1.6 mL (0.0096 mol, 20% molar excess) of phenyldimethylchlorosilane. This mixture was heated for 1 hour at 50° C. The brown solid dissolved and a white precipitate formed. The mixture was then stirred for an additional 16 hours at room temperature, the polymer was recovered and dried in a vacuum oven for 18 hours at 60° C.

A summary of the amounts of the ingredients used in this example appears below:

Cyclohexane—400 mL. Difunctional initiator precursor (1)—0.68 mL, (i.e., 0.008 mol total anion); PMDETA—0.150 mL, 0.0013 mol.; Isoprene—20.0 mL, 0.200 mol.; phenyldimethylchlorosilane 1.6 mL, 0.0096 mol.

Characterization ($PhMe_2Si$-ended polymer): Microstructure—75% 1,4-addition; molecular weight—$M_n$=5740, $M_w/M_n$=1.49; percent endcapping=100%.

This example demonstrates that the use of an amine (even at a ratio of 1:6) using initiator (2) leads to high degree of endcapping. The polydispersity is relatively high because the amine was added along with the initiator prior to polymerization. This example demonstrates that, even though initiator (2) initiates polymerization at only one end of the chain, the other "inactive" anionic end can be endcapped with the promoters of the invention to result in a silyl-functional telechelic polymer.

When the amine is added after the polymerization step, but prior to the addition of the endcapping silane in the above procedure, essentially the same microstructure and degree of endcapping are obtained, but the polydispersity is ≤ 1.2.

That which is claimed is:

1. A method for preparing a silyl-functional telechelic polydiene comprising:
(I) reacting, in a non-polar solvent solution, a mixture comprising
(A) at least one monomer having the general formula $$CH_2=C(Q)CH=CH_2$$

wherein Q is selected from the group consisting of hydrogen, a methyl radical, fluorine and chlorine, and
(B) a dianionic initiator which is soluble in said non-polar solvent,
to form a dianionically active polydiene; and
(II) capping both ends of said dianionically active polydiene from step (I) with
(D) a silane having the formula $$R_nSiX_{(4-n)}$$

wherein R is independently selected from the group consisting of hydrogen, an alkyl radical having 1 to 20 carbon atoms and an aryl radical having 6 to 14 carbon atoms, X is independently selected from the group consisting of halogen, acyloxy having 2 to 6 carbon atoms, dialkylaminoxy having 2 to 12 carbon atoms and alkoxy having 1 to 6 carbon atoms and n is an integer having a value of 0 to 3, with the proviso that when R is hydrogen the value of n is 1 or 2 and when n=3 at least one R is an aryl radical,
said capping being carried out in the presence of
(E) a promoter selected from the group consisting of a tertiary amine and a crown ether based on 12-crown-4, wherein said silyl-functional telechelic polydiene has at least 70% 1,4-microstructure and at least 70% of its end groups are capped by said silane.

2. The method according to claim 1, further comprising hydrogenating said silyl-functional telechelic polydiene.

3. The method according to claim 1, wherein said monomer (A) is isoprene.

4. The method according to claim 1, wherein said monomer (A) is 1,3-butadiene.

5. The method according to claim 1, wherein said mixture of step (I) further comprises
(C) a polymerization adjuvant selected from the group consisting of an organic tertiary amine, an organic alkoxide and an ether, and
said initiator (B) is a lithium compound based on double 1,1-diphenylethylene.

6. The method according to claim 5, wherein R of said silane (D) is selected from the group consisting of hydrogen, methyl and phenyl and X of said silane (D) is selected from the group consisting of chlorine, acetoxy, ethoxy and methoxy.

7. The method according to claim 5, wherein said adjuvant (C) is an organic tertiary amine.

8. The method according to claim 7, wherein said promoter (E) is an organic tertiary amine.

9. The method according to claim 8, wherein R of said silane (D) is selected from the group consisting of hydrogen, methyl and phenyl and X of said silane (D) is selected from the group consisting of chlorine, acetoxy, ethoxy and methoxy.

10. The method according to claim 9, wherein said silane (D) has a formula selected from the group consisting of Si(OMe)$_4$,
Si(OEt)$_4$,
Si(OAc)$_4$,
MeSi(OMe)$_3$,
Me$_2$Si(Cl)$_2$,
PhMe$_2$SiCl,
Ph$_2$MeSiCl and
Me$_2$Si(H)Cl, wherein Me, Et, Ph and Ac denote methyl, ethyl, phenyl and acetyl groups, respectively.

11. The method according to claim 1, wherein said initiator (B) is a lithium compound based on 1,3-dialkenylbenzene.

12. The method according to claim 11, wherein said promoter (E) is an organic tertiary amine.

13. The method according to claim 12, wherein R of said silane (D) is selected from the group consisting of hydrogen, methyl and phenyl and X of said silane (D) is selected from the group consisting of chlorine, acetoxy, ethoxy and methoxy.

14. The method according to claim 13, wherein said silane (D) has a formula selected from the group consisting of Si(OMe)$_4$,
Si(OEt)$_4$,
Si(OAc)$_4$,
MeSi(OMe)$_3$,
Me$_2$Si(Cl)$_2$,
PhMe$_2$SiCl,
Ph$_2$MeSiCl and
Me$_2$Si(H)Cl, wherein Me, Et, Ph and Ac denote methyl, ethyl, phenyl and acetyl groups, respectively.

15. The method according to claim 1, wherein the polydispersity of said silyl-functional telechelic polydiene is $\leq 1.2$.

16. The method according to claim 2, wherein the polydispersity of said silyl-functional telechelic polydiene is $\leq 1.2$.

17. The method according to claim 3, wherein the polydispersity of said silyl-functional telechelic polydiene is $\leq 1.2$.

18. The method according to claim 4, wherein the polydispersity of said silyl-functional telechelic polydiene is $\leq 1.2$.

19. A silyl-functional telechelic polydiene having a main chain consisting essentially of repeat units based on a diene of the formula $$CH_2=C(Q)CH=CH_2$$

in which Q is selected from the group consisting of hydrogen, a methyl radical, fluorine and chlorine, wherein at least 70% of said repeat units based on said diene have a 1,4-microstructure and wherein at least 70% of the terminal groups of said polydiene have the formula $$R_nSiX_{(3-n)}-$$

in which R is independently selected from the group consisting of hydrogen, an alkyl radical having 1 to 20 carbon atoms and an aryl radical having 6 to 14 carbon atoms, X is independently selected from the group consisting of halogen, acyloxy having 2 to 6 carbon atoms, dialkylaminoxy having 2 to 12 carbon atoms and alkoxy having 1 to 6 carbon atoms and n is an integer having a value of 0 to 3, with the proviso that when R is hydrogen the value of n is 1 or 2 and when n=3 at least one R group is an aryl radical.

20. The polydiene according to claim 19, wherein Q is hydrogen.

21. The polydiene according to claim 19, wherein Q is a methyl radical.

22. The polydiene according to claim 19, wherein R of said terminal group is selected from the group consisting of hydrogen, methyl and phenyl and X of said terminal group is selected from the group consisting of chlorine, acetoxy, ethoxy and methoxy.

23. The polydiene according to claim 19, wherein said terminal group is selected from the group consisting of Si(OMe)$_3$—,
Si(OEt)$_3$—,
Si(OAc)$_3$—,
MeSi(OMe)$_2$—,
Me$_2$Si(Cl)—,
PhMe$_2$Si—,
Ph$_2$MeSi— and
Me$_2$Si(H)—, in which Me, Et, Ph and Ac denote methyl, ethyl, phenyl and acetyl groups, respectively.

24. The polydiene according to claim 19 which is hydrogenated.

25. The polydiene according to claim 22 which is hydrogenated.

26. The polydiene according to claim 23 which is hydrogenated.

27. The polydiene according to claim 19, wherein the polydispersity of said silyl-functional telechelic polydiene is $\leq 1.2$.

28. The polydiene according to claim 24, wherein the polydispersity of said silyl-functional telechelic polydiene is $\leq 1.2$.

29. The polydiene according to claim 25, wherein the polydispersity of said silyl-functional telechelic polydiene is $\leq 1.2$.

30. The polydiene according to claim 26, wherein the polydispersity of said silyl-functional telechelic polydiene is $\leq 1.2$.

31. A silyl-functional telechelic copolymer having a main chain formula selected from the group consisting of

—ZGZ— and

—GZ— wherein

G is a polydiene segment consisting essentially of repeat units based on a diene of the formula $$CH_2=C(Q)CH=CH_2$$

in which Q is selected from the group consisting of hydrogen, a methyl radical, fluorine and chlorine and Z represents a segment consisting essentially of repeat units based on a non-diene, olefinic, anionically polymerizable monomer, at least 70% of said repeat units based on said diene having a 1,4-microstructure and at least 70% of the terminal groups of said copolymer having the formula $$R_nSiX_{(3-n)}-$$

in which R is independently selected from the group consisting of hydrogen, an alkyl radical having 1 to 20 carbon atoms and an aryl radical having 6 to 14 carbon atoms, X is independently selected from the group consisting of halogen, acyloxy having 2 to 6 carbon atoms, dialkylaminoxy having 2 to 12 carbon atoms and alkoxy having 1 to 6 carbon atoms and n is an integer having a value of 0 to 3, with the proviso that when R is hydrogen the value of n is 1 or 2 and when n=3 at least one R group is an aryl radical.

32. The copolymer according to claim 31, wherein the polydispersity of said polydiene segment is $\leq 1.2$.

33. The copolymer according to claim 31 which is hydrogenated.

34. The copolymer according to claim 31, wherein said non-diene monomer is styrene.

* * * * *